US009925722B2

(12) United States Patent
Martin

(10) Patent No.: US 9,925,722 B2
(45) Date of Patent: Mar. 27, 2018

(54) 3-D PRINTER

(71) Applicant: Matthew H. Martin, Lomita, CA (US)

(72) Inventor: Matthew H. Martin, Lomita, CA (US)

( * ) Notice: Subject to any disclaimer, the term of this patent is extended or adjusted under 35 U.S.C. 154(b) by 441 days.

(21) Appl. No.: 14/550,482

(22) Filed: Nov. 21, 2014

(65) Prior Publication Data

US 2016/0144569 A1    May 26, 2016

(51) Int. Cl.
| | | |
|---|---|---|
| *B29C 67/00* | (2017.01) | |
| *B29C 64/20* | (2017.01) | |
| *B33Y 30/00* | (2015.01) | |
| *B29C 64/227* | (2017.01) | |
| *B29C 64/236* | (2017.01) | |
| *B29C 64/209* | (2017.01) | |
| *B29C 64/232* | (2017.01) | |
| *B33Y 40/00* | (2015.01) | |

(52) U.S. Cl.
CPC .......... *B29C 67/0085* (2013.01); *B29C 64/20* (2017.08); *B29C 64/209* (2017.08); *B29C 64/227* (2017.08); *B29C 64/232* (2017.08); *B29C 64/236* (2017.08); *B33Y 30/00* (2014.12); *B33Y 40/00* (2014.12)

(58) Field of Classification Search
CPC ... B29C 67/0085; B29C 64/20; B29C 64/209; B29C 64/227; B29C 64/232; B29C 64/236; B33Y 40/00; B33Y 30/00
USPC ......................................................... 425/150
See application file for complete search history.

(56) References Cited

U.S. PATENT DOCUMENTS 8,181,692 B2 * 5/2012 Frasier .................. B22D 47/00
164/122.1
2013/0078325 A1 * 3/2013 Sperry ................ B29C 67/0055
425/169

* cited by examiner

*Primary Examiner* — Seyed Masoud Malekzadeh
(74) *Attorney, Agent, or Firm* — Fulwider Patton LLP

(57) ABSTRACT

A three-dimensional (3D) printing device has at least one collapsible vertical or horizontal axis using a scissor lift mechanism. One of the horizontal axis's can be made operable via a track or path where the entire machine moves along that path via movable wheels or gears. Sensors may monitor the height, orientation, position, and relative distance of the axes, machine, or extruders. Compensating mechanisms such as counterweights, propellers, or gyroscopes may be used to maintain balance, levelness, and control of the system. As a result, the size and weight of the 3D printer is reduced and made easier to transport while maintaining quality build functionality.

17 Claims, 10 Drawing Sheets

3-D PRINTER

TECHNICAL FIELD

The present invention relates to a three dimensional (3D) printing device.

BACKGROUND

Three dimensional (3D) printing is a form of additive manufacturing also known as stereolithography ("STL") or Fusion Deposition Method (FDM). Structures, parts, or items may be manufactured by building up successive layers of material which are either fused, adhered, or hardened together. A computer may control the movement and deposition of the desired material, which can be a malleable material such as plastic, through an extruder assembly. Many other materials, for example concrete (concrete like materials), chocolate (food products), rubber, nylon, electrically conductive resins, metals, and epoxy-like (resin hardeners) materials can also be used as well as other materials.

Typically, the extruder assembly heats the material and extrudes it onto a printing surface or platform. The extruder assembly's movement may be controlled by a series of actuators, servo-motors, or other movement mechanisms to allow for control in two or more dimensions by a computer. The deposited material layers then cool and harden into the desired shape or form. In some cases the extruder assembly may not require a heating element such as with concrete and the deposited material sets by virtue of other mechanisms such as elapsed time.

Current 3D printers are constructed with beams or rods that extend the entire height, length, and width (x, y, and z axis) of the printable area. The extruder assembly may be able to travel up and down or side to side along the rods or, alternatively, the build platform or printing surface may be able to travel up or down vertical rods or beams. These configurations allow the desired part to be built by moving the extruder assembly along the vertical and horizontal axis. The limitations of this type of configuration include limited mobility, large size, and weight. It's also sometimes difficult to adjust and maintain levelness of the extrusion assembly plane through the entire build operation.

There is a need in the art of three dimensional printers to reduce the amount of space that such printers take up while not in use, and make them more flexible in operation. The present invention is suited to address these needs and more.

SUMMARY OF THE INVENTION

The present invention is a three dimensional printer that controls a vertical movement of an extruder assembly using scissor lift-type linkages that collapse and expand to several times their contracted height. This allows the 3D printer to be stored or transported in smaller containers, since the printer does not include a frame that encloses the maximum volume of the object to be printed. In the case of a personal 3D printer, it may be designed to fit in a convenient carry-all or suit case, and then when in use expand vertically to print taller objects. In the case of 3D printer used to build large concrete structures such as homes, it may be designed to fit on the back of truck trailer and expand to build multiple storied structures.

Gyroscopic, optical, or magnetic sensors may be incorporated into the 3D printer along with compensating mechanisms such as counterweights, hydraulics, motor control, or propellers. The levelness or desired orientation of the extruder assembly plane can be monitored and maintained with a computer that corrects such imperfections hundreds of times per second by finely adjusting the height of each vertical scissor lift or other compensation mechanism according to readings from the various sensors. This allows the 3D printer to function properly despite unevenness of the ground or unexpected changes in the environment.

DETAILED DESCRIPTION OF THE PREFERRED EMBODIMENTS

Figure 1:
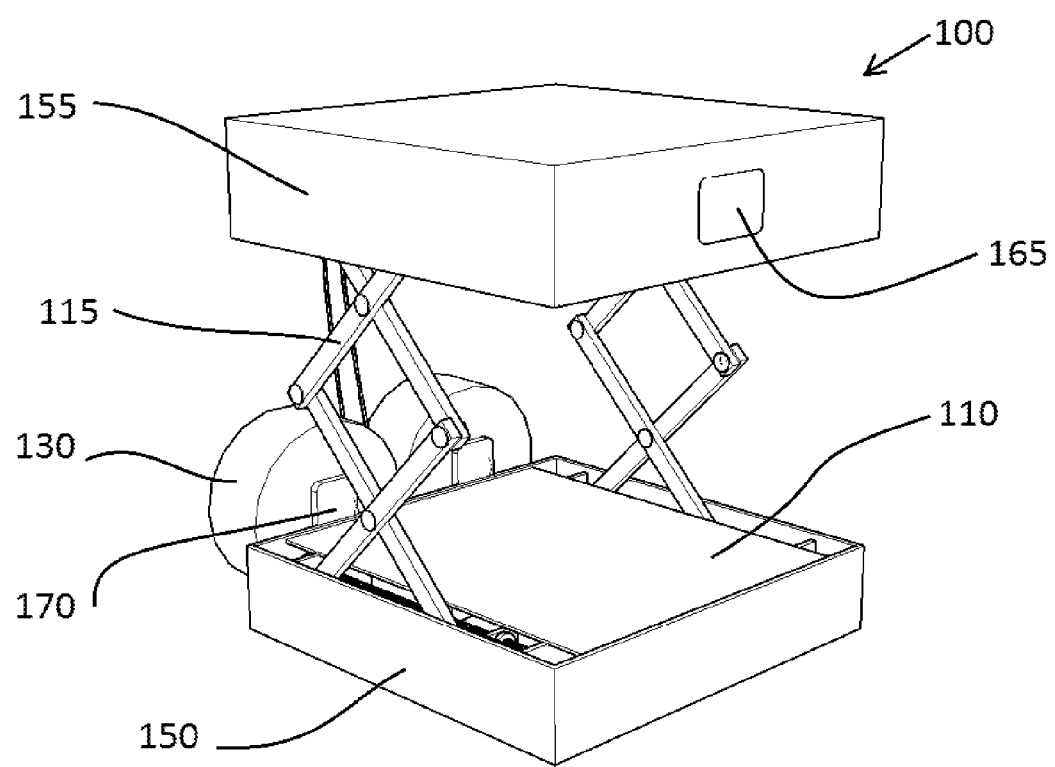
FIG. 1 is an elevated, perspective view of a collapsible 3D printer system in accordance with embodiments of the presented invention.

FIG. 1 shows an embodiment of a collapsible 3D printer 100. The system includes a base housing 150 containing various mechanical, electrical, and electronic components that operate the printer 100. An upper housing 155 is positioned above and parallel to the base housing 150 and houses the extruder assembly (not shown) as well as mechanical and electronic components that operate the printer 100. The upper housing 155 and the lower housing 150 are connected by collapsible scissor linkages 115 that allow the printer 100 to collapse and expand in the vertical direction while remaining parallel to each other. The build material 130 may be kept on spool brackets 170 and fed into the upper housing 155 and through the extruder system. The extruder system is movable along 2 perpendicular horizontal axes and deposits the material 130 onto the build platform 110. The material 130 is deposited onto the build platform 110 as the linkage 115 moves the upper housing 155 in the vertical direction so that sequential layers of material may be deposited onto the build platform 110. A system interface 165 is incorporated onto the front of upper housing 155 or lower housing 150 and may include user input devices such as a touchscreen, buttons, keyboard, or any combination thereof.

Figure 2:
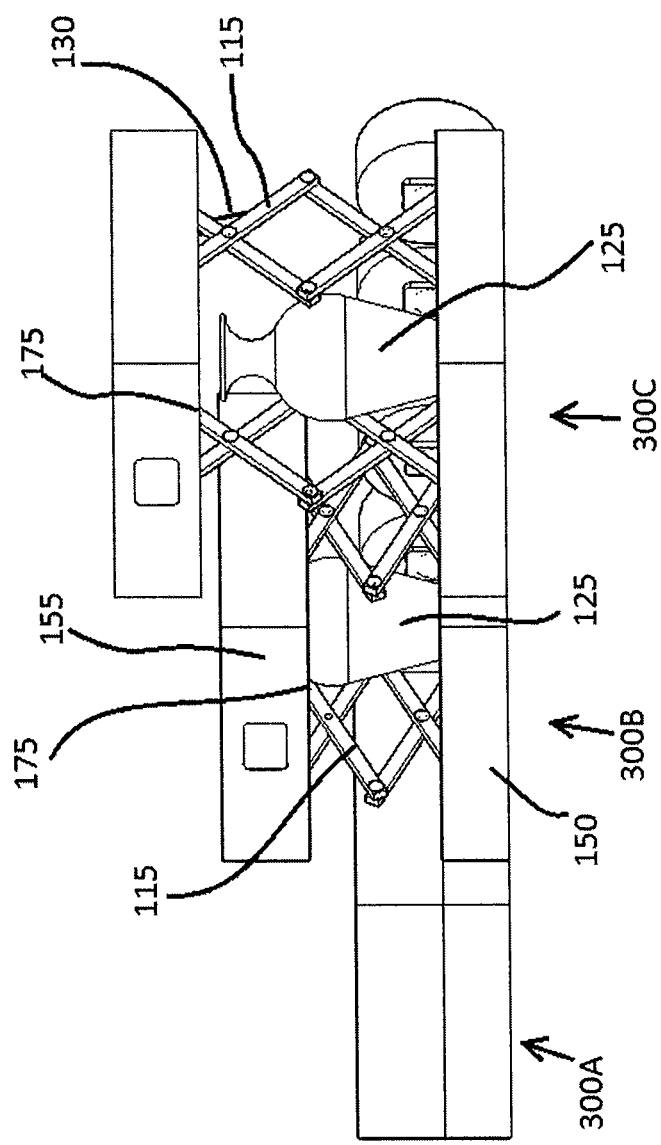
FIG. 2 is a side view of the collapsible 3D printer of FIG. 1.

FIG. 2 illustrates a 3D printing system 300A, 300B, and 300C as it moves through its various stages of operation. 300A shows a 3D printing system in its collapsed and transportable position. 300B shows a 3D printing system roughly halfway through the building of an object 125. The vertical linkages 115 expand in the vertical direction and moves the upper housing 155 away from the lower housing 150 to allow for the object 125 to be constructed via sequential layers of material that are deposited via the extruder nozzle 175 movable via a stepper motor drive system onto the build platform 110. 300C shows a completed build operation in which the vertical linkages 115 may be fully extended and the build object 125 is completed.

Figure 3:
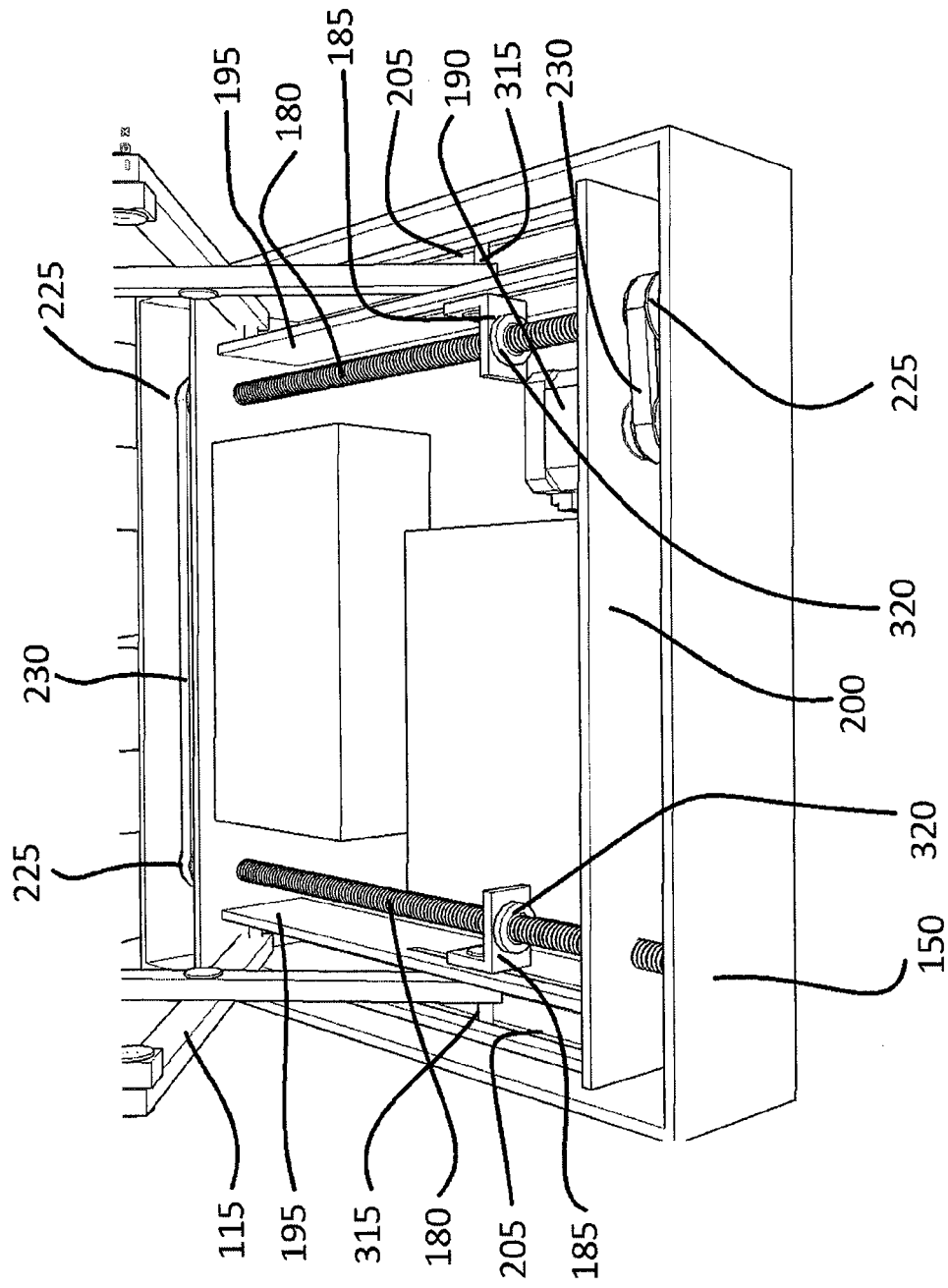
FIG. 3 is an elevated perspective view of a lift mechanism for use in the collapsible 3D printer of FIG. 1.
Figure 4:
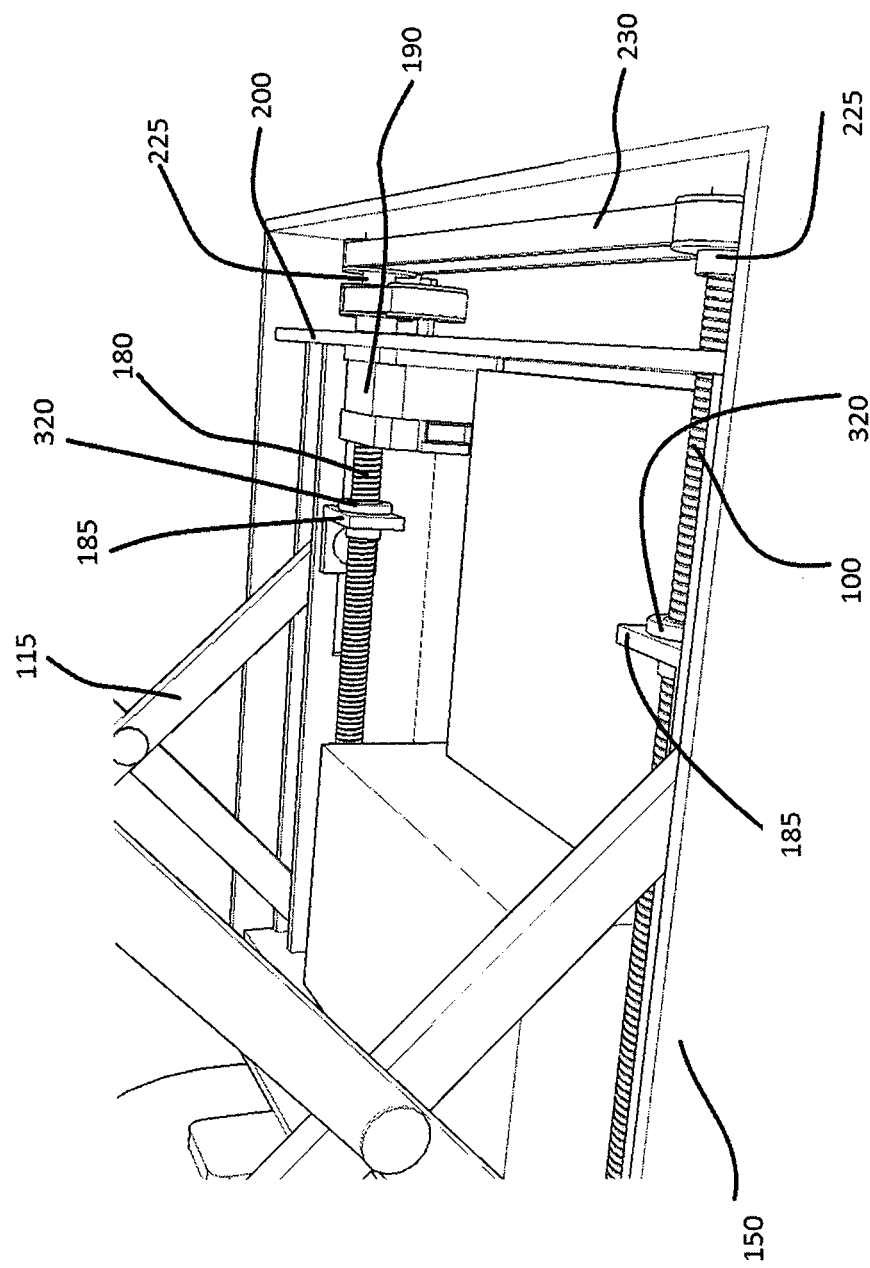
FIG. 4 is an elevated side perspective view of the lift mechanism of FIG. 3.

FIGS. 3 and 4 detail the mechanical drive system of the vertical linkages 115 in the illustrated embodiment. Two threaded rods 180 are mounted on opposite sides of a secure metal or plastic frame 200 and are rotatable via a stepper motor 190. Each threaded rod 180 threads through a drive bracket 185 which has a threaded hole 320 threaded onto rod 180. A pair of pulleys 225 are configured in such a way that the two rods are rotated precisely the same amount and geared advantageously to the stepper motor 190. In this embodiment, pulleys 225 are attached to each end of each threaded rod 180 and connected by belts 230. As the rods 180 are rotated, drive brackets 185 are driven along a linear path and move the bottom legs of the scissor lift linkages 115 closer or father apart from each other thus extending or collapsing the height of the printer 100. The drive brackets 185 are mounted to housing 200 with a bolt 315 that extends through slotted hole 205 and a linkage 115. The movement path of linkage 115 is constrained on one leg via a stationary but rotatable mounting bolt 195 and a slotted hole 205 on the other via bolt 315.

Figure 5:
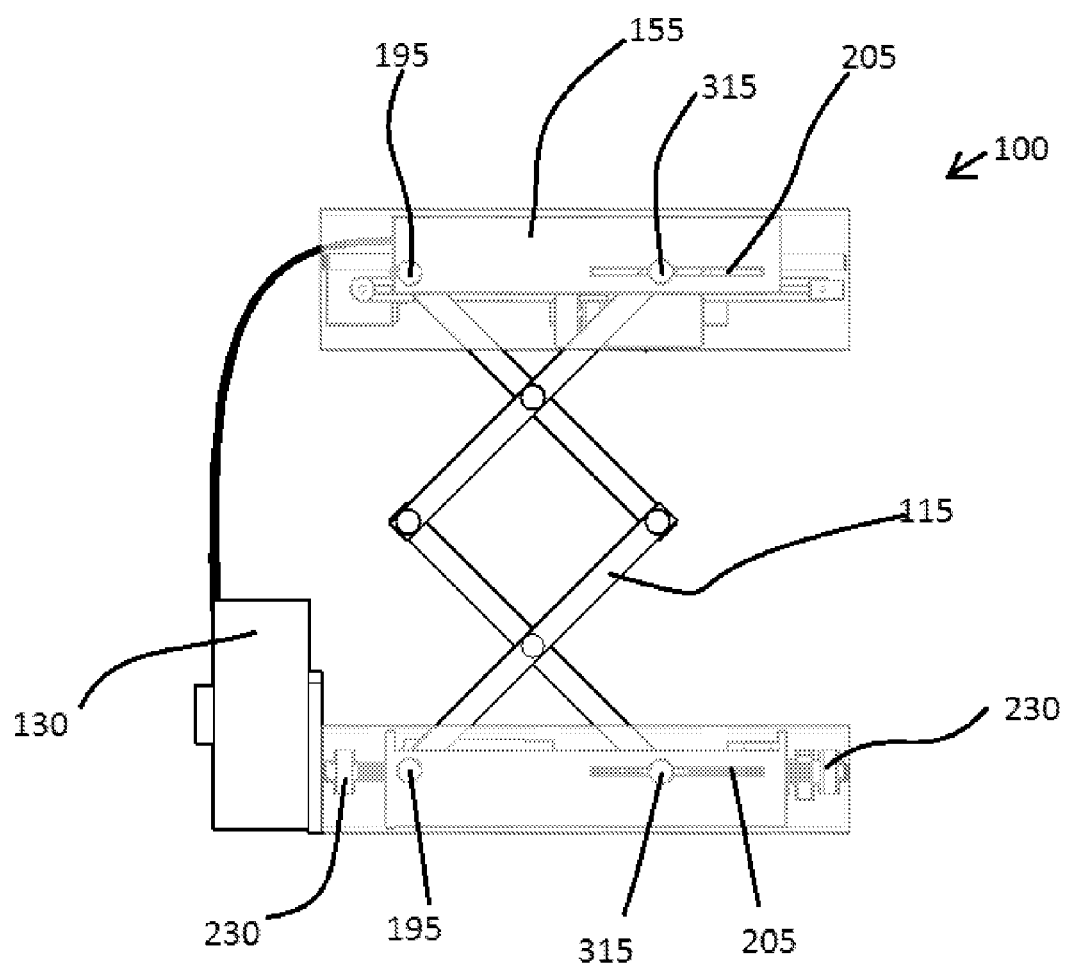
FIG. 5 is a side view, partially in phantom, of the collapsible 3D printer of FIG. 1.

FIG. 5 is a side view of 3D printer 100 partially in phantom to reveal how scissor lift linkage 115 connects to upper housing 155 and lower housing 150 via stationary bolts 195 and movable bolts 315. Stationary bolts 195 allow arm of linkage 115 to rotate freely via its mounted position while movable bolts 315 allow the other arm of linkage 115 to move along slotted hole 205. Lower housing 150 has a motor 190 and threaded rods 180 while upper housing 155 may or may not have threaded rods 180 or motor 190, although these two housings can be reversed.

Figure 6:
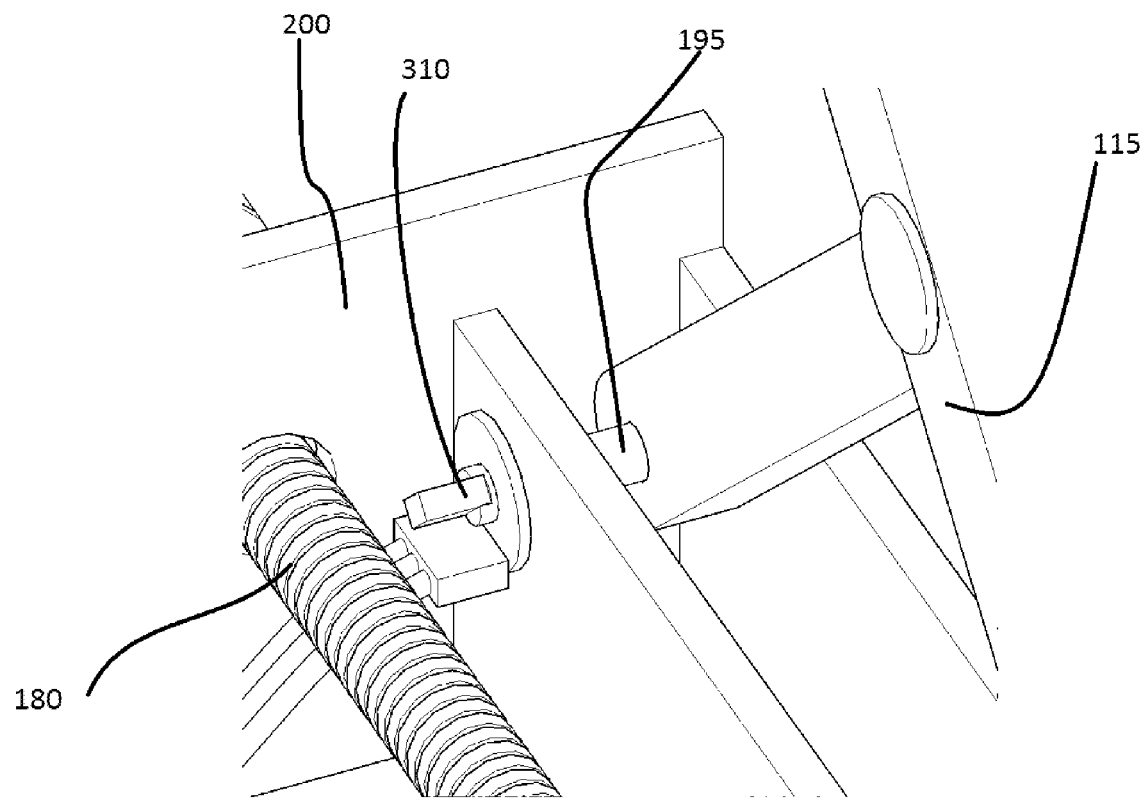
FIG. 6 is an enlarged, perspective view of a rotational angle sensor in accordance with embodiments of the presented invention.

FIG. 6 Shows how the height of the linkage system 115 may be monitored by a rotation sensor (otherwise known as a hall effect sensor) 305 which may determine the angle at which the linkage 115 are positioned by measuring the magnetic field of a magnet 310 that is attached to bolt 195, and that is fastened to linkage 115. Most current 3D printer computer systems operate via a Cartesian coordinate system and all of the generated build paths are constructed as such. Since the scissor lift mechanism shown in this embodiment of the invention is non-linear, the rotation angle or polar coordinates of the linkage arms 115 may be converted to linear height through the following equation, $y=\sqrt{a^2-2*x^2}$ where a=the length of the linkage arms (all arms are the same length). The proper acceleration rate of motor 190 can then be calculated to move the extrusion assembly the proper linear distance based on its current position. The proper build path may now be constructed and sent to the collapsible 3D printer 100 via computer, USB drive, or other appropriate method.

Figure 7:
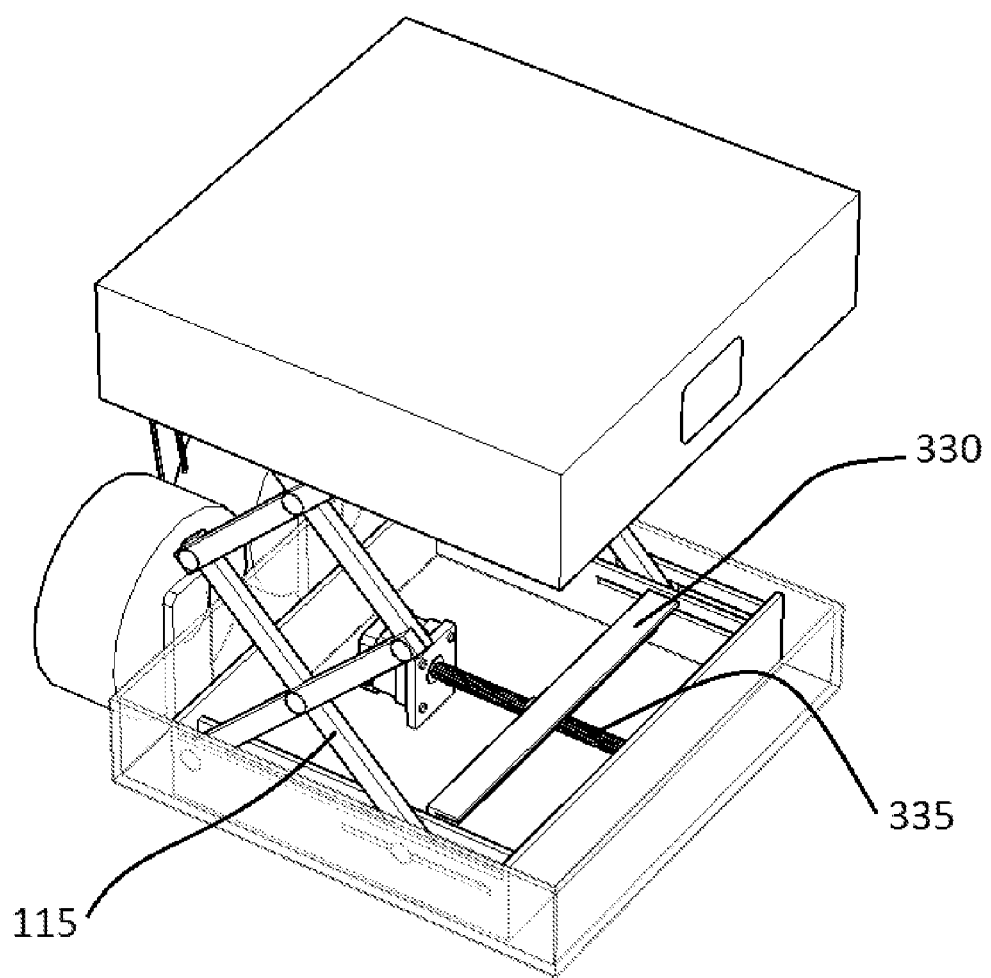
FIG. 7 is an elevated, perspective view of a second embodiment of a collapsible 3D printer.

FIG. 7 is a perspective view of an alternate embodiment of a collapsible 3D printer that utilizes a drive bar 330 and a single threaded rod 335 to move linkage 115. The threaded rod 335 is coupled to the drive bar 330 and displaces the drive bar through rotation of the threaded rod. In this manner, the linkages 115 can be opened or closed to extend or contract the printer assembly.

Figure 8:
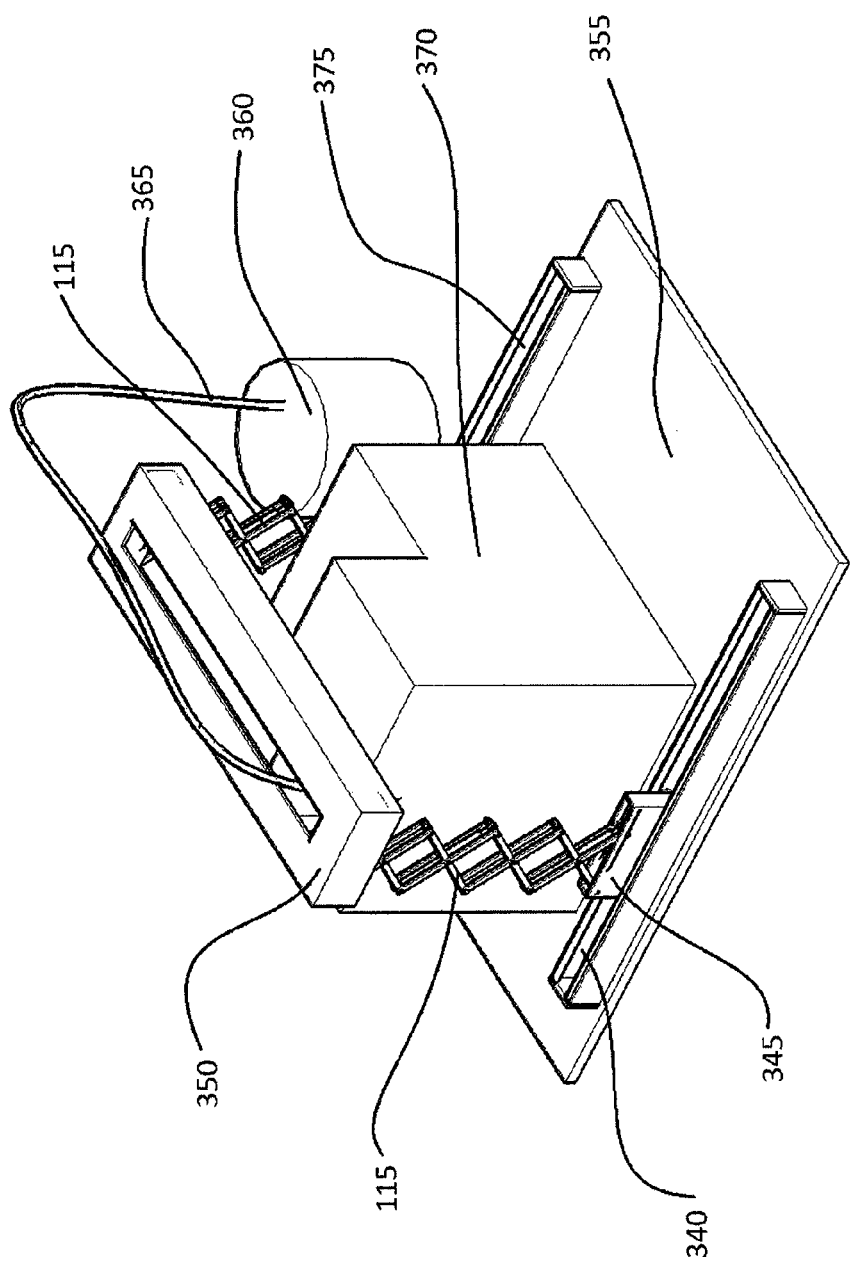
FIG. 8 is an elevated, perspective view of a third embodiment of a collapsible 3D printer.

FIG. 8 is a perspective view of an alternate embodiment of a collapsible 3D printer that makes one axis of the machine movable via parallel tracks 340 and 375. A scissor lift linkage 115 is mounted to movable cart 345 in the same fashion as previous embodiments but also has wheels, coasters, gliders, or other friction-reducing elements that ride within track 340 on both sides of the build area 355 and are driven by a motor or engine (not shown). One or more movable extruder systems are mounted within housing 350 that extend the width of build area 355 and is connected to the top of each linkage 115 in the same manner as previous embodiments. A concrete mixer 360 may deliver concrete via hose 365 to a movable nozzle (not shown) within housing 350. The nozzle is able to move the length of housing 350 and deposit un hardened concrete onto build platform 355 as needed by a computer control system. The linkage 115 may move the housing 350 vertically as needed to provide z-axis movement while movable carts 345 may provide movement along length of the build area 355 and build concrete structure 370. One or more gyroscopic sensors may be incorporated into housing 350. The levelness or parallel orientation of housing 350 with relation to the build platform 355 can be monitored and maintained with a computer that corrects such imperfections hundreds of times per second by finely adjusting the height of each vertical linkage 115 or other compensation mechanism according to readings from the gyroscopic sensors. Housing 350 is then able to maintain a level orientation despite the possible unevenness of tracks 340 and 375. Additional magnetic and/or optical sensors may be incorporated into the machine for monitoring the distance between components and/or the build object.

Figure 9:
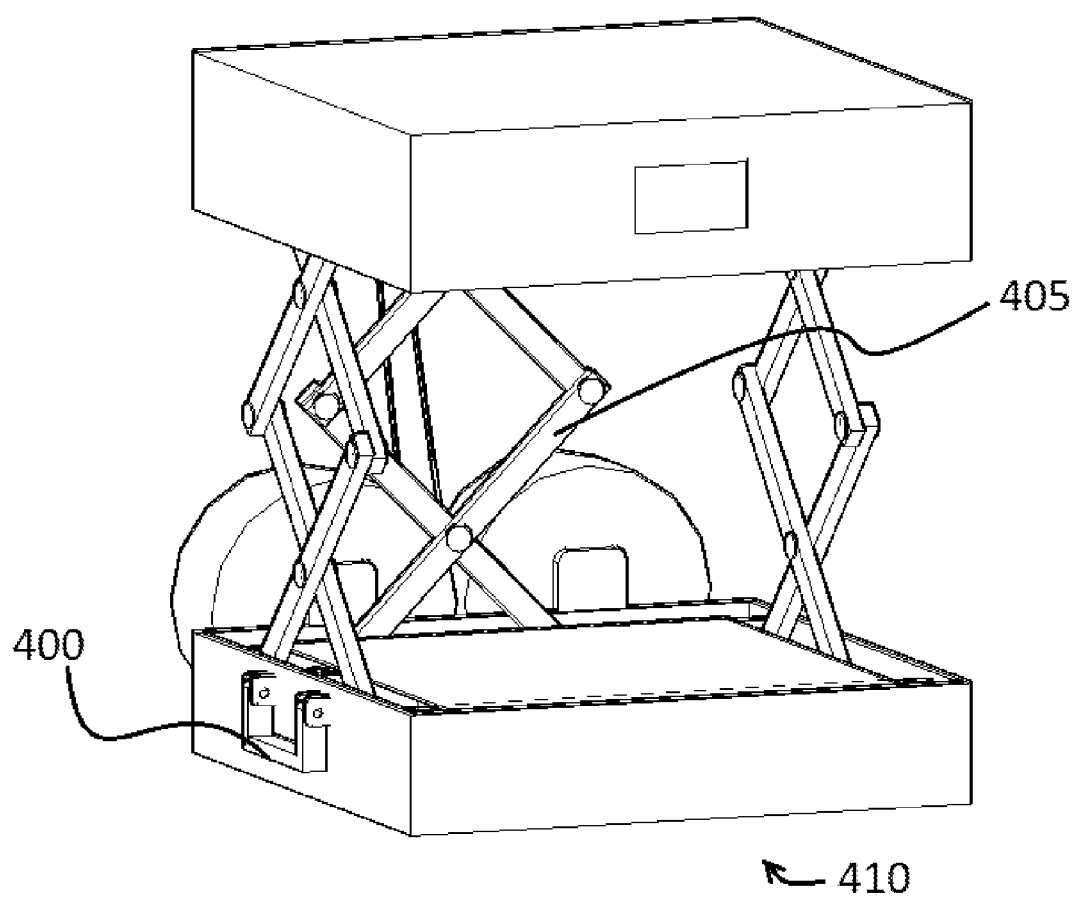
FIG. 9 is an elevated, perspective view of a fourth embodiment of a collapsible 3D printer.

FIG. 9 is a perspective view on an alternate embodiment of a collapsible 3D printer 410 that includes a carrying handle 400 and a third set of collapsible scissor lift linkages 405. The third set of linkages 405 provides additional lateral stability to the system during print operations.

Figure 10:
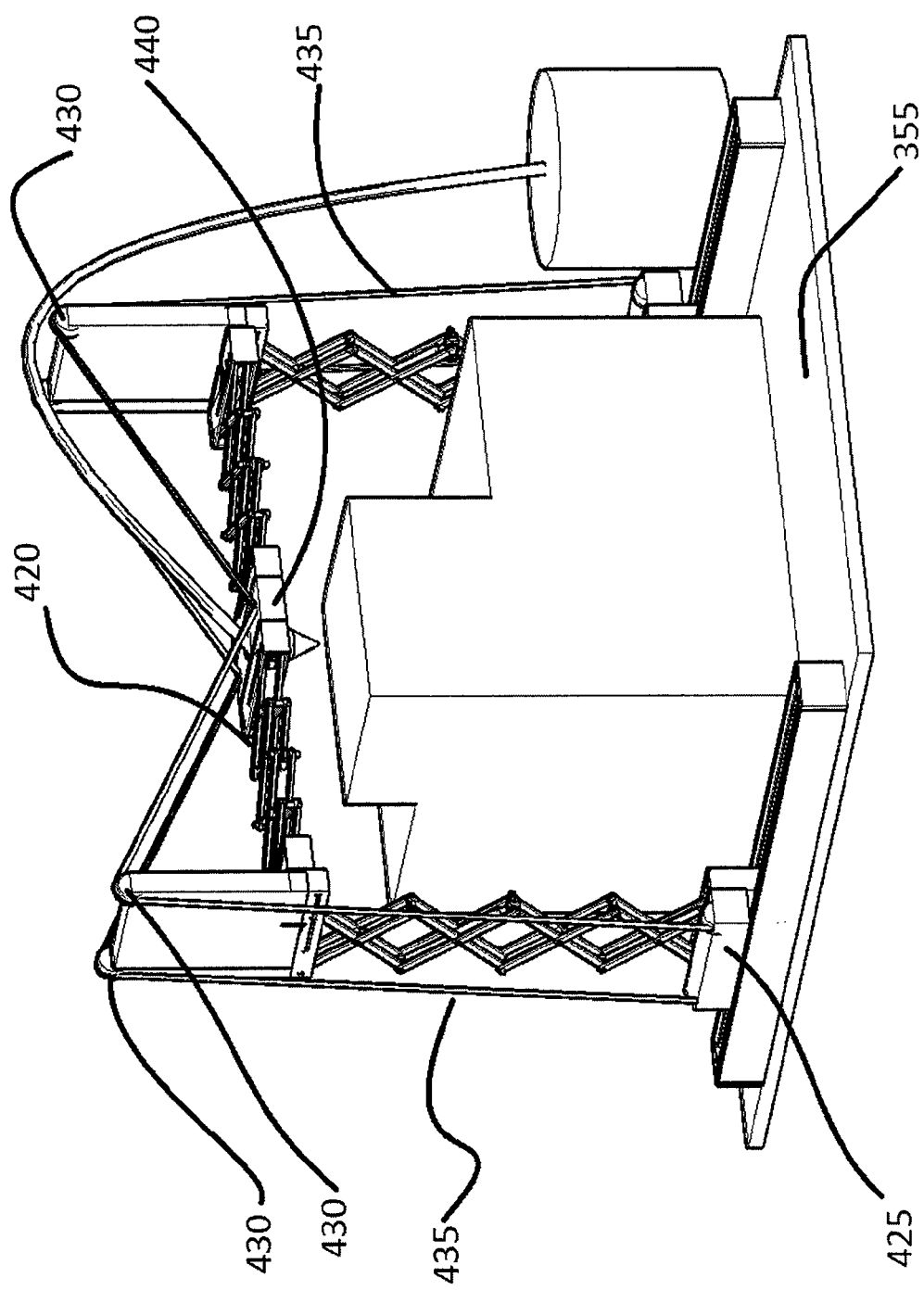
FIG. 10 is an elevated, perspective view of a fifth embodiment of a collapsible 3D printer.

FIG. 10 is a perspective view on an alternate embodiment of a collapsible 3D printer. Two motor driven vertical linkages 435 support two horizontal linkages 420 and a control head 440 with one or more extruders or other attachments designed to place building materials. Two motor driven wenches 425 use cables 435 and pulleys 430 to help support, control, and balance the control head 440. The control head may have gyroscopic sensor which monitors its position in multiple dimensions. The wenches 425 can either increase or decrease the lift on the control head 440 depending on the readings from sensors. This embodiment of the invention is advantageous because the horizontal axis of the machine can be collapsed or retracted, just like the vertical axis, making the machine smaller and easier to transport. The integrated sensors and compensating mechanisms help the machine to maintain proper alignment with the build surface 355.

I claim:

1. A reciprocating three dimensional printer, comprising:
a lower housing incorporating a drive system;
an upper housing, including a material deposition nozzle for delivering material to a platform disposed between the upper housing and the lower housing, wherein the material deposition nozzle is movable along two perpendicular horizontal axes in addition to its vertical movement;
a first and second set of collapsible scissor linkages connecting the upper housing to the lower housing, the first and second set of linkages scissoring in response to the drive system to collapse and expand in a vertical direction while remaining parallel to each other to move the upper housing and the material deposition nozzle in the vertical direction, wherein the first and second linkages are configured to expand in the vertical direction and move the upper housing away from the lower housing to allow for an object to be constructed by depositing sequential layers of material that are deposited via the material deposition nozzle which is movable by the drive system, and wherein the lower housing is itself movable in a horizontal direction.

2. The reciprocating three dimensional printer of claim 1, further comprising a user interface on a first surface of one of the upper housing and lower housing.

3. The reciprocating three dimensional printer of claim 2, wherein the user interface includes a touchscreen.

4. The reciprocating three dimensional printer of claim 1, wherein the drive system includes a stepper motor.

5. The reciprocating three dimensional printer of claim 1, further comprising a rotation sensor for monitoring the angle that the linkages form with a horizontal plane.

6. The reciprocating three dimensional printer of claim 5, where the rotation sensor is a Hall Effect sensor.

7. The reciprocating three dimensional printer of claim 6, wherein the rotational sensor detects the position of a magnet on a selected component of the first and second set of linkages.

8. The reciprocating three dimensional printer of claim 1, wherein the drive system includes a drive bar to move the first and second set of linkages.

9. The reciprocating three dimensional printer of claim 1, wherein the lower housing is contained within a cart.

10. The reciprocating three dimensional printer of claim 1, further comprising a computer for monitoring and adjusting a height of the upper housing multiple times per second.

11. The reciprocating three dimensional printer of claim 1, further comprising a level sensor for determining a levelness of the upper housing relative to a horizontal plane.

12. The reciprocating three dimensional printer of claim 1, further comprising a gyroscopic sensor.

13. The reciprocating three dimensional printer of claim 1, further comprising a counterweight to control a movement of the upper housing.

14. The reciprocating three dimensional printer of claim 1, further comprising at least one motor driven wench.

15. The reciprocating three dimensional printer of claim 1, further comprising an optical sensor to determine a distance between a component of the printer and a build object.

16. The reciprocating three dimensional printer of claim 1, further comprising a spool bracket for positioning build material to the three dimensional printer.

17. The reciprocating three dimensional printer of claim 1, further comprising a carrying handle.

* * * * *